Nov. 8, 1938.  F. C. ELDER  2,135,886

TIRE WIRE AND METHOD OF MAKING THE SAME

Filed April 16, 1934

Inventor:
FLINT C. ELDER,
by: Usina & Rauber
his Attorneys.

Patented Nov. 8, 1938

2,135,886

UNITED STATES PATENT OFFICE 2,135,886

TIRE WIRE AND METHOD OF MAKING THE SAME

Flint C. Elder, Cleveland Heights, Ohio, assignor to The American Steel and Wire Company of New Jersey, a corporation of New Jersey Application April 16, 1934, Serial No. 720,878

2 Claims. (Cl. 18—59)

This invention relates to articles which must be coated with or embedded in rubber compound, one of the objects being to provide such an article and a method of making the same that is improved respecting the article's rubber adhering and corrosion resistant qualities.

Tire wire is a good example of such an article. This wire is used to form the beads of automobile tires. It is embedded in the rubber compound of which tires are made and this compound is vulcanized thereto. Obviously, it must be of such a character that the rubber compound adheres firmly thereto. Also, it should be extremely resistant to atmospheric corrosion.

Figure 1:
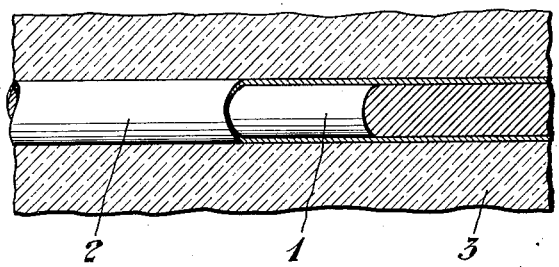
Figure 2:
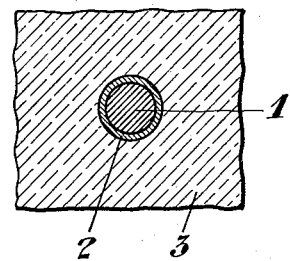
Figure 3:
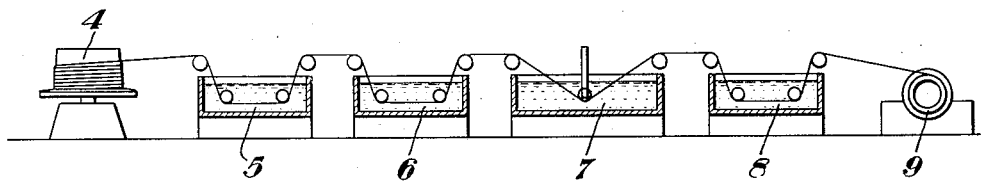

In the accompanying drawing, Figure 1 is a sectional view of a piece of tire wire to which rubber compound is vulcanized, Figure 2 is a cross-section of Figure 1, and Figure 3 is a diagrammatic illustration of apparatus which may be used in the manufacture of this wire.

More particularly, Figures 1 and 2 show a tire wire that is characterized by firm adherence with rubber compound vulcanized thereto and good resistance to atmospheric corrosion. It consists of a steel wire 1 that has a coating 2 of a copper-tin alloy that is of a greater thickness than can be obtained by chemical deposition. This copper-tin alloy coating does not contain more than 20 per cent copper nor, preferably, less than .5 per cent copper. Rubber compound 3 surrounds the tire wire and is vulcanized to the same. It may be assumed that these figures represent a fragment of an automobile tire.

The above described tire wire is distinguished from ordinary tire wire in that the coating 2 is of the alloy mentioned and is much thicker than is ordinary when applied directly to the wire 1. Heretofore, the coating on tire wire has usually consisted of a very thin coating of copper that is chemically or electrochemically deposited. In some cases, the wire has the well known liquor finished coating which is a mixture of copper and tin applied by dipping the steel wire in a solution of copper and tin sulphates. In both instances, the coating is very thin and does not materially protect the steel underneath from atmospheric corrosion.

The tire wire which has just been described may be made by means of the apparatus illustrated by Figure 3. The steel wire is passed from a reel 4 successively through a cleaning acid bath 5, a flux bath 6, a molten copper-tin alloy bath 7, a bath of cooling fluid 8, and so to a take-up block 9. Various wipes may be used between the various baths, as found desirable. The copper-tin alloy bath should contain not more than 20 per cent copper and should be maintained at temperatures of approximately from 800 to 825 degrees Fahrenheit.

It is now apparent that the coating 2 on the steel wire 1 is characterized by having been applied while in the molten state. It is for this reason that it is substantially thicker than any coating which might be deposited by chemical means. Although copper may be electrochemically deposited on the steel wire to practically any thickness, the expense involved makes this practice commercially impossible.

The present inventor has discovered that a copper-tin alloy containing relatively small amounts of copper is characterized by just as firm an adherence with rubber compound vulcanized to the same as results when using copper alone. Furthermore, that the use of such an alloy permits the utilization of commercial equipment such as is ordinarily used to apply molten zinc or tin to steel wire.

That is to say, that a copper-tin alloy having not more than 20 per cent copper has a copper content sufficient to provide the desired adhesive characteristics but insufficient to raise the alloy's melting point above that permitting the use of conventional hot metal coating equipment. Although less than 10 per cent provides the desired adhesive characteristic when certain rubber compounds are used, it does not provide it when certain other rubber compounds are used. A minimum of 5 to 10 per cent copper content alloy has been found to provide the desired characteristic when used in connection with any tire bead rubber compound commercially employed at the present time.

I claim:

1. An article made of steel, a copper-tin alloy coating over said article and a rubber compound vulcanized to said coating, said copper-tin alloy coating containing not more than 20 per cent copper.

2. A method of making a steel article that is characterized by firm adherence with rubber compound vulcanized thereto and good resistance to atmospheric corrosion, including applying a copper-tin alloy coating to said article by immersing it in a molten bath of the same, said alloy containing not more than 20 per cent copper and said bath of the same being maintained at temperatures of from approximately 800 to 825 degrees Fahrenheit, and vulcanizing rubber compound to said article.

FLINT C. ELDER.